Figure 4:
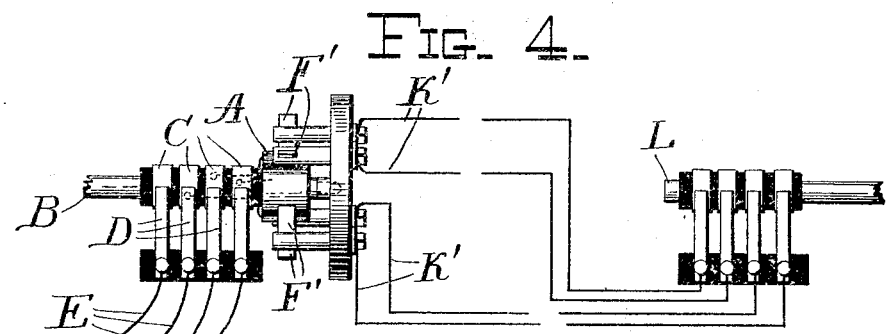

(No Model.) 9 Sheets—Sheet 1.
H. A. ROWLAND.
PHASE MODIFICATION.
No. 547,683. Patented Oct. 8, 1895.
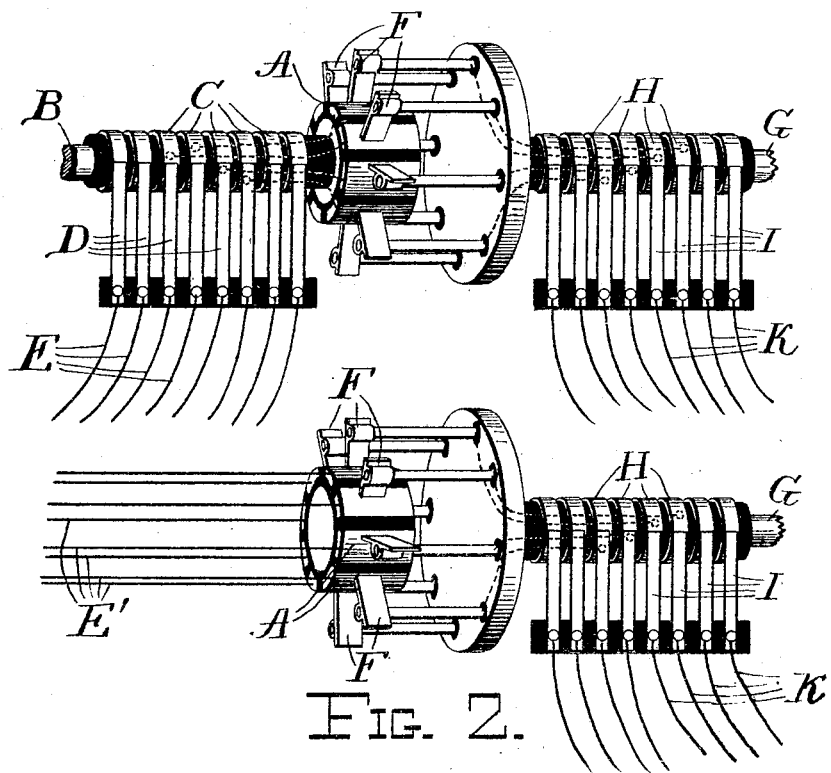
FIG. 1.
FIG. 2.
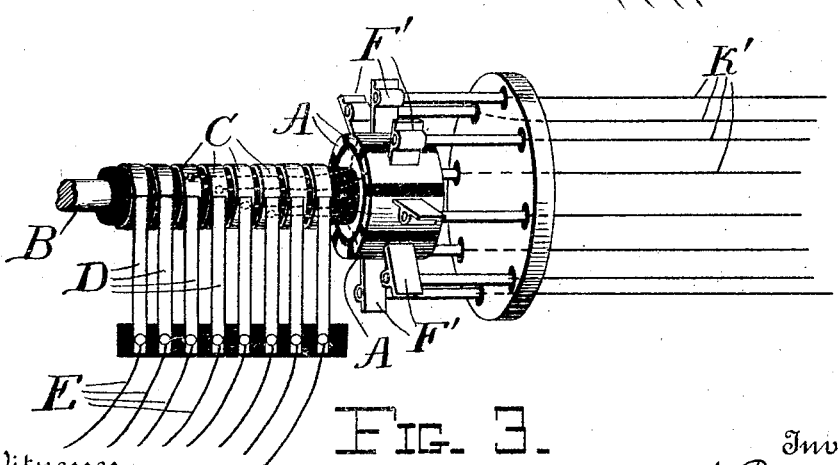
FIG. 3.
Witnesses
Percy C. Bowen
J. C. Wilson
Inventor
Henry A. Rowland
By Whitman & Wilkinson
Attorneys.

(No Model.)   9 Sheets—Sheet 2.

H. A. ROWLAND.
PHASE MODIFICATION.

No. 547,683.   Patented Oct. 8, 1895.

Witnesses
Percy C. Bowen
J. C. Wilson

Inventor
Henry A. Rowland
By Whitman & Wilkinson
Attorneys (No Model.)
9 Sheets—Sheet 3.

H. A. ROWLAND.
PHASE MODIFICATION.

No. 547,683.  Patented Oct. 8, 1895.

Witnesses
Percy C. Bowen
J. C. Wilson

Inventor
Henry A. Rowland
By Whitman & Wilkinson
Attorneys (No Model.) 9 Sheets—Sheet 4.

H. A. ROWLAND.
PHASE MODIFICATION.

No. 547,683. Patented Oct. 8, 1895.

Fig. 9ª.

Fig. 10ª.

Witnesses
Percy C. Bowen
J. C. Wilson

Inventor
Henry A. Rowland,
by Whitman & Wilkinson
Attorney.

(No Model.) 9 Sheets—Sheet 5.

H. A. ROWLAND.
PHASE MODIFICATION.

No. 547,683. Patented Oct. 8, 1895.

Witnesses
Percy C. Bowen
J. P. Wilson

Inventor
Henry A. Rowland
By Whitman & Wilkinson
Attorneys.

(No Model.)

H. A. ROWLAND.
PHASE MODIFICATION.

No. 547,683.

9 Sheets—Sheet 6.

Patented Oct. 8, 1895.

Witnesses
Perry C. Bowen
J. H. Wilson

Inventor
Henry A. Rowland
By Whitman & Wilkinson
Attorneys

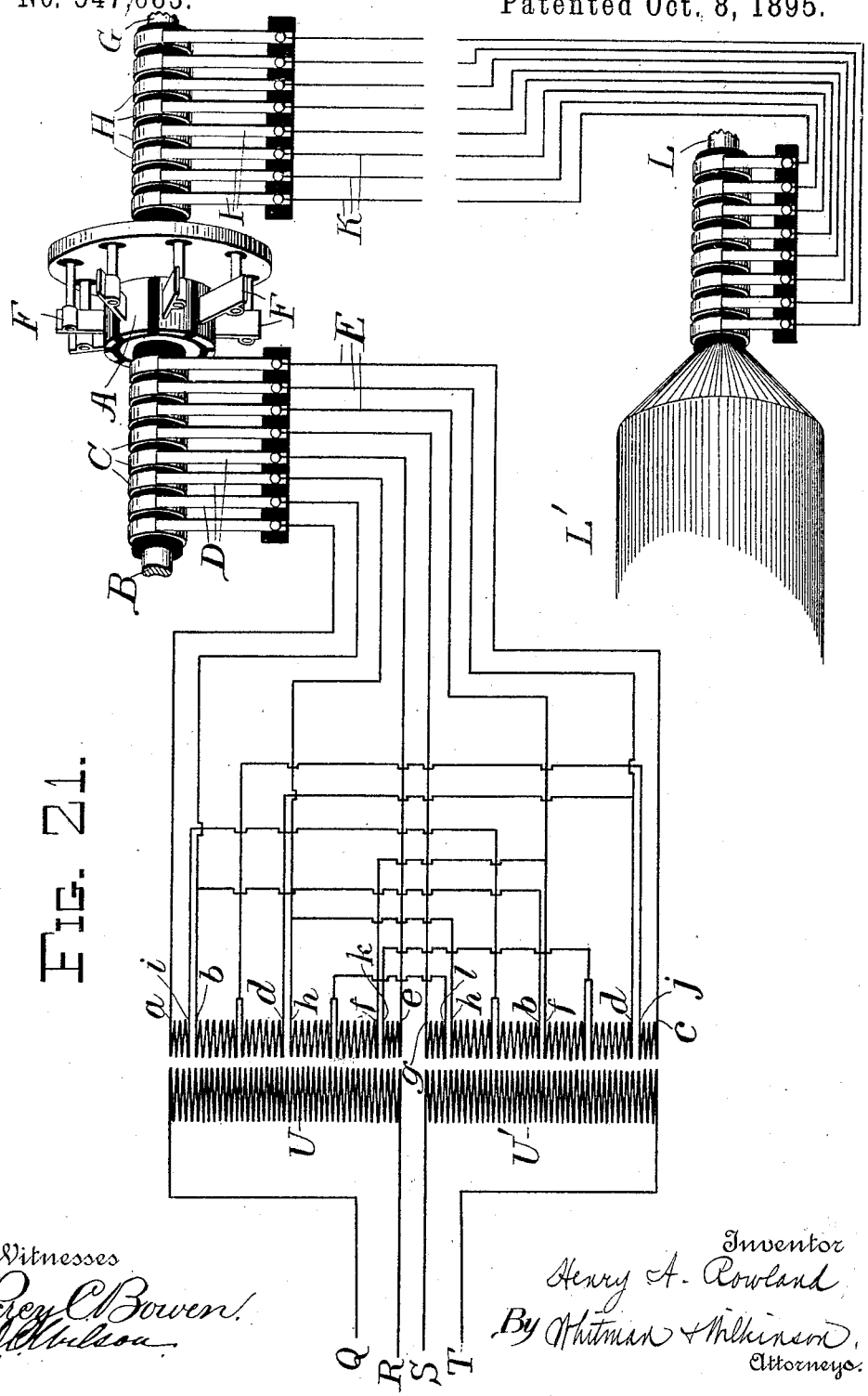

(No Model.) 9 Sheets—Sheet 8.
H. A. ROWLAND.
PHASE MODIFICATION.
No. 547,683. Patented Oct. 8, 1895.
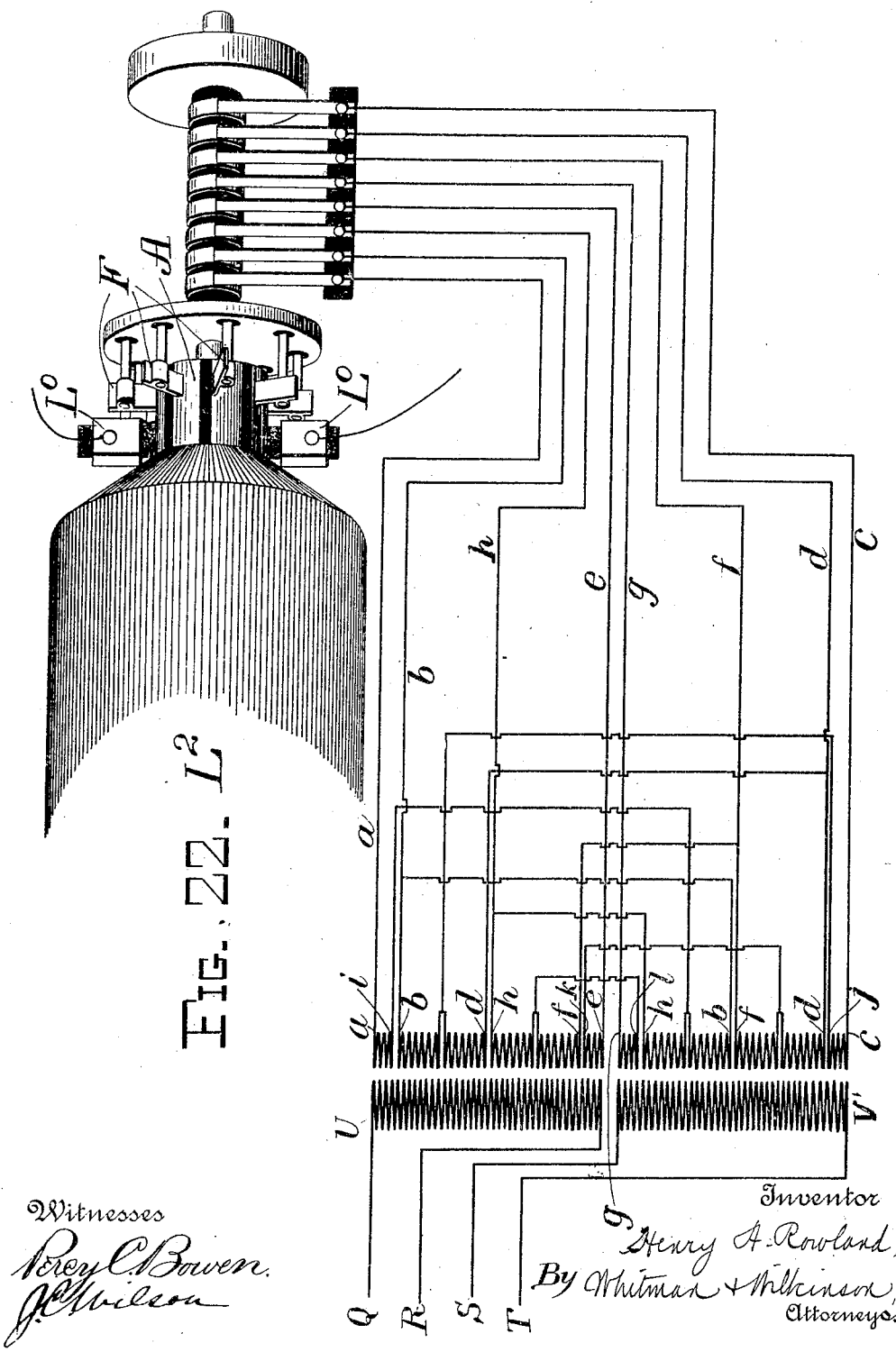
Witnesses
Percy C. Bowen.
J. C. Wilson
Inventor
Henry A. Rowland,
By Whitman & Wilkinson,
Attorneys.

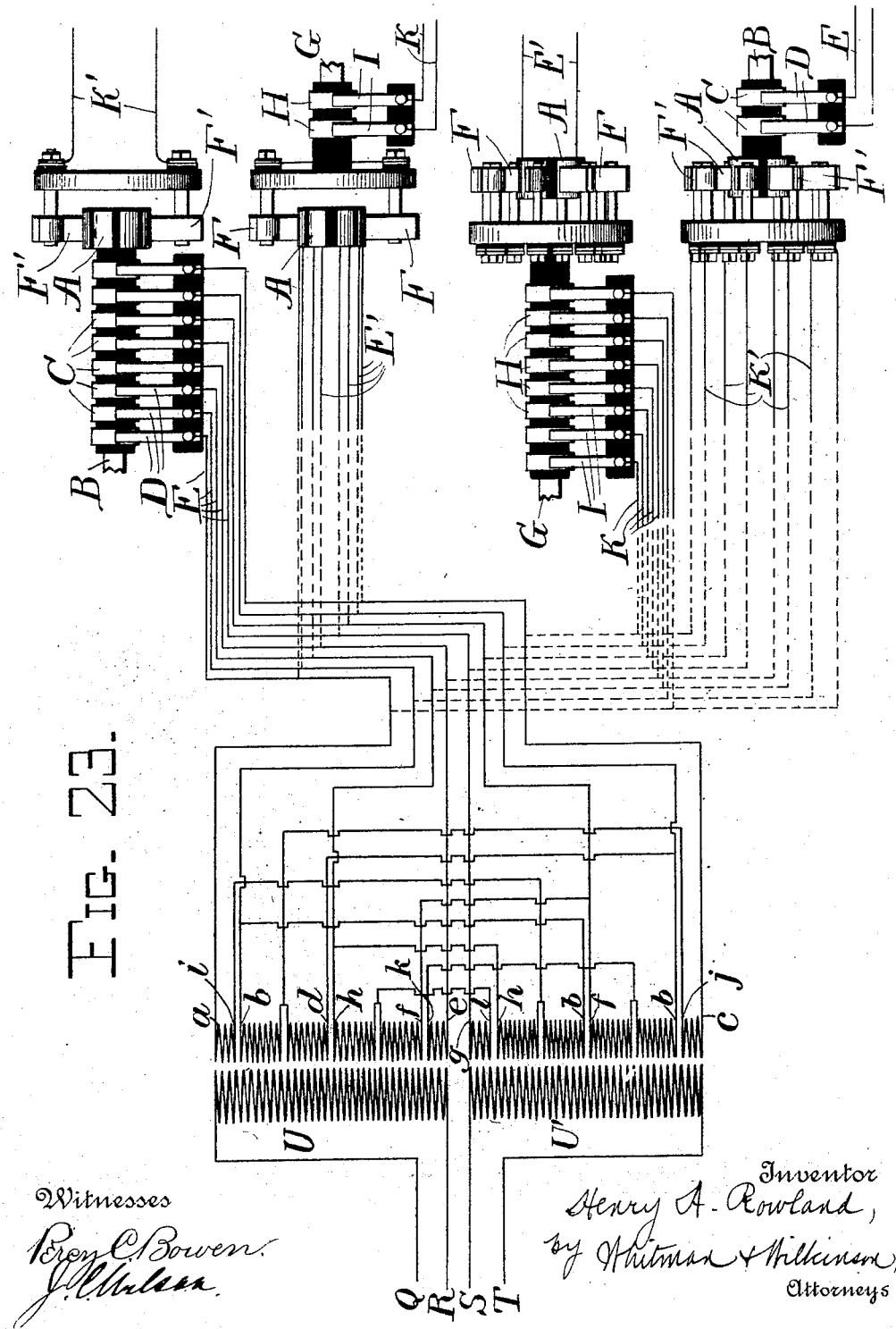

UNITED STATES PATENT OFFICE.

HENRY A. ROWLAND, OF BALTIMORE, MARYLAND.

PHASE MODIFICATION.

SPECIFICATION forming part of Letters Patent No. 547,683, dated October 8, 1895.

Application filed May 19, 1894. Serial No. 511,851. (No model.) Patented in England June 7, 1894, No. 11,059, and in France June 7, 1894, No. 239,124.

*To all whom it may concern:*

Be it known that I, HENRY A. ROWLAND, a citizen of the United States, residing at Baltimore, in the State of Maryland, have invented certain new and useful Improvements in Methods of Varying the Frequency and Number of Phases in a Polyphase Current, (for which I have obtained Letters Patent in Great Britain, No. 11,059, dated June 7, 1894, and in France, No. 239,124, dated June 7, 1894;) and I do hereby declare the following to be a full, clear, and exact description of the invention, such as will enable others skilled in the art to which it appertains to make and use the same.

My invention relates to methods of varying the frequency and number of phases in a polyphase current; and the object of this invention is to vary the frequency of a polyphase current from zero to any desired frequency, as may be desired, to produce means for starting synchronous and other motors and causing them to run at different speeds and to accomplish with other translating devices a variety of other results of a like nature. To accomplish this I use the combination, with a commutator which may be either stationary or revolving, of brushes which may be either revolving or stationary. The bars of the commutator are joined to conductors from the source of electricity either directly or by means of contact rings and brushes, and the current is carried from the commutator by brushes rubbing thereon, these latter brushes being either fixed or revolving independently of the commutator, as will be hereinafter described; or the current may enter the brushes and be carried off from the commutator-bars, if desired. Currents from these brushes or commutator-bars may be taken directly from them when they are stationary, or through contact-rings and other brushes when revolving.

Reference is had to the accompanying drawings, in which the same parts are indicated by the same letters throughout the several views.

Figure 5:
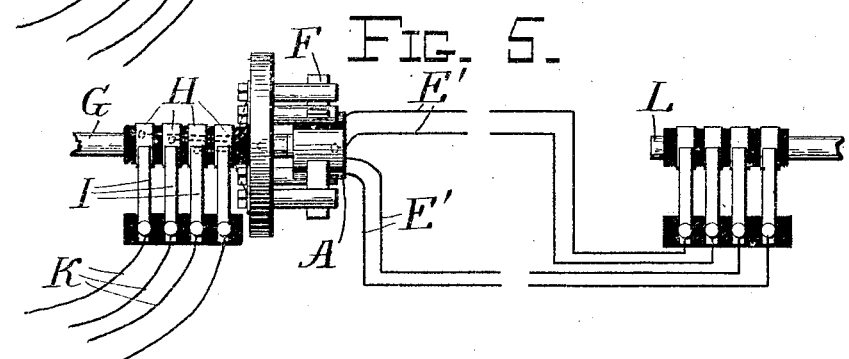
Figure 6:
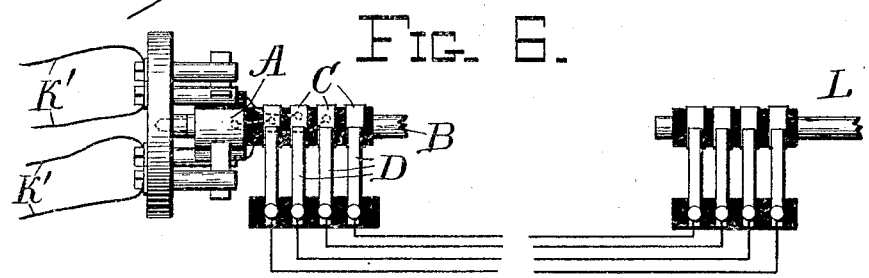
Figure 7:
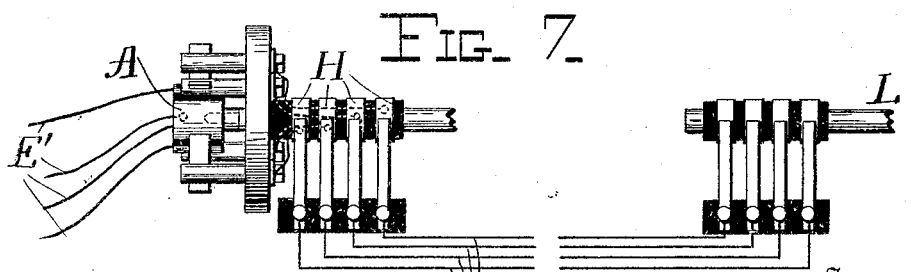
Figure 8:
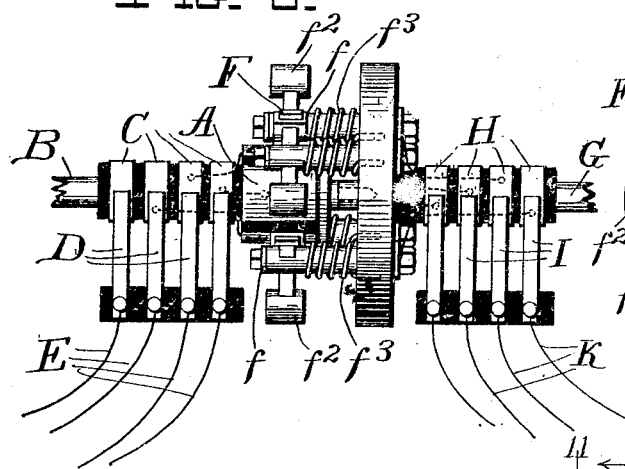
Figure 9:
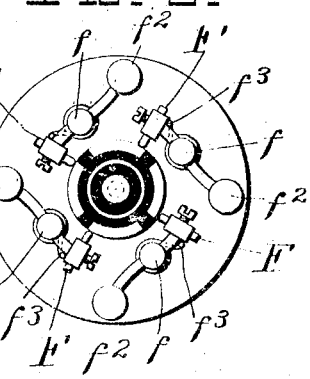
Figure 10:
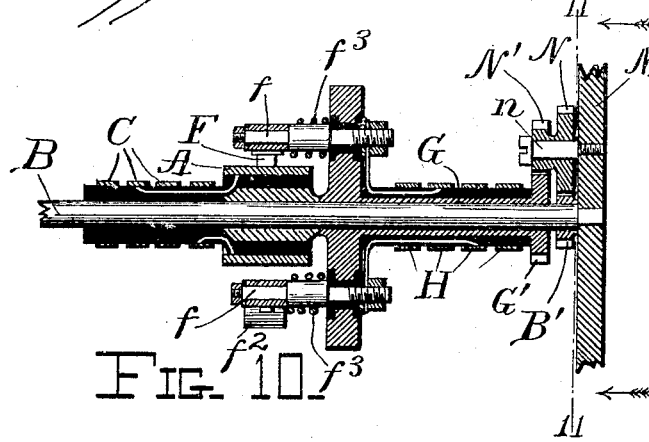
Figure 11:
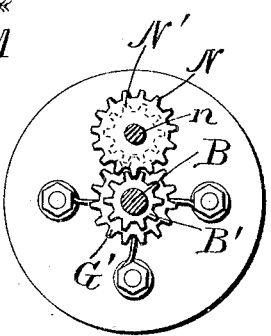
Figure 12:
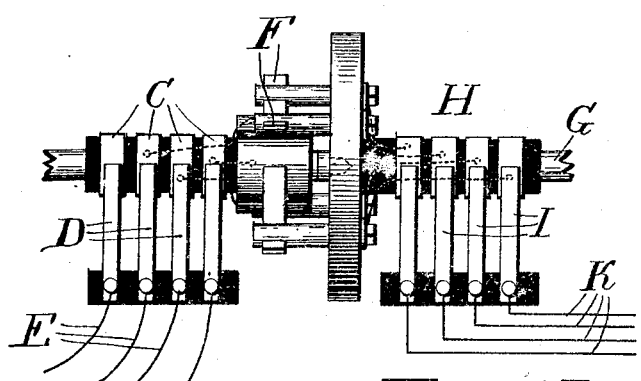
Figure 13:
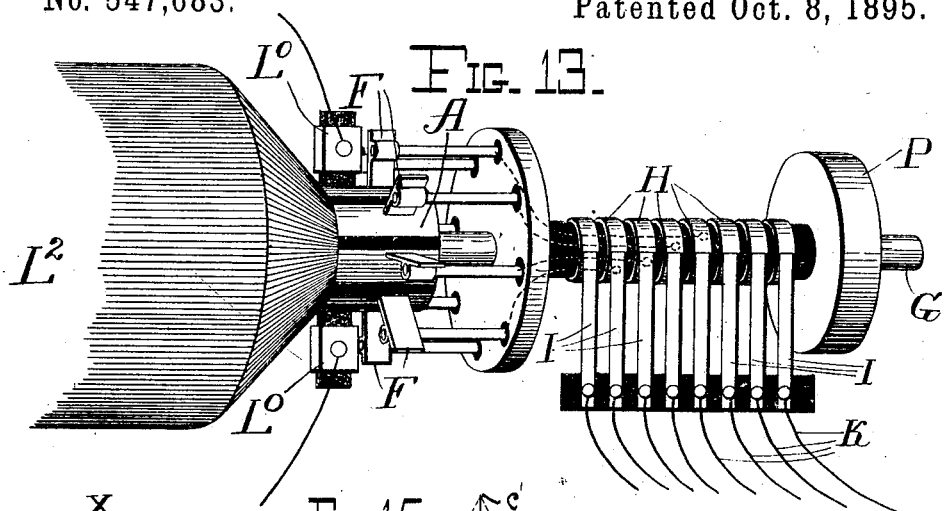
Figures 14, 15, 16:
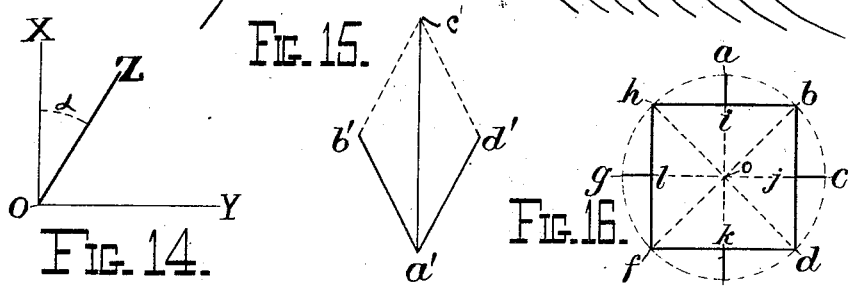

Figure 1 represents a perspective view of a commutator and brushes mounted on independent shafts and capable of revolving independently of each other. Fig. 2 represents a modification of the same device in which the brushes only revolve, the conductors being joined directly to the bars of the commutator, which is fixed. Fig. 3 represents a further modification of the device shown in Fig. 1, with the conductors jointed directly to the brushes, which are fixed, while the commutator is adapted to revolve. Fig. 4 represents a revolving commutator and fixed brushes, the conductors leading directly from the brushes to the contact-brushes of a motor or dynamo. Fig. 5 differs from Fig. 4 in having the commutator stationary and the brushes revolving. Fig. 6 shows a lead of the conductors somewhat different from the construction shown in Fig. 4. Fig. 7 shows a lead of the conductors somewhat different from the construction shown in Fig. 5. Fig. 8 is a similar view to that shown in Fig. 1, and shows a method of preventing the revolving brushes from leaving the commutator-surface under the action of centrifugal force. Fig. 9 represents an end view of the revolving brushes shown in Fig. 8. Fig. 9ª represents an end view of another device for adjusting the revolving brushes against the action of centrifugal force. Fig. 10 shows in section a means of gearing together the shaft carrying the commutator and the one carrying the brushes, so that they will maintain a fixed ratio in their speeds. Fig. 10ª represents a section along the line $xx$ of Fig. 9ª. Fig. 11 represents a section along the line 11 11 of Fig. 10, and looking in the direction of the arrow. Fig. 12 represents a diagrammatic view of the revolving commutator and brushes shown in Fig. 1, with conductors leading from the side of the revolving brushes to the contact-brushes of a motor or dynamo. Fig. 13 represents the revolving brushes shown in Fig. 1 mounted to revolve on the commutator of a dynamo or motor. Fig. 14 shows the method of indicating graphically the intensity and phase of an electromotive force. Fig. 15 shows the method of finding the intensity and phase of an electromotive force, which is the resultant of two electromotive forces of different phases acting in series. Fig. 16 shows the graphic method of determining the ratio of the windings in the

UNITED STATES PATENT OFFICE.

HENRY A. ROWLAND, OF BALTIMORE, MARYLAND.

PHASE MODIFICATION.

SPECIFICATION forming part of Letters Patent No. 547,683, dated October 8, 1895.

Application filed May 19, 1894. Serial No. 511,851. (No model.) Patented in England June 7, 1894, No. 11,059, and in France June 7, 1894, No. 239,124.

*To all whom it may concern:*

Be it known that I, HENRY A. ROWLAND, a citizen of the United States, residing at Baltimore, in the State of Maryland, have invented certain new and useful Improvements in Methods of Varying the Frequency and Number of Phases in a Polyphase Current, (for which I have obtained Letters Patent in Great Britain, No. 11,059, dated June 7, 1894, and in France, No. 239,124, dated June 7, 1894;) and I do hereby declare the following to be a full, clear, and exact description of the invention, such as will enable others skilled in the art to which it appertains to make and use the same.

My invention relates to methods of varying the frequency and number of phases in a polyphase current; and the object of this invention is to vary the frequency of a polyphase current from zero to any desired frequency, as may be desired, to produce means for starting synchronous and other motors and causing them to run at different speeds and to accomplish with other translating devices a variety of other results of a like nature. To accomplish this I use the combination, with a commutator which may be either stationary or revolving, of brushes which may be either revolving or stationary. The bars of the commutator are joined to conductors from the source of electricity either directly or by means of contact rings and brushes, and the current is carried from the commutator by brushes rubbing thereon, these latter brushes being either fixed or revolving independently of the commutator, as will be hereinafter described; or the current may enter the brushes and be carried off from the commutator-bars, if desired. Currents from these brushes or commutator-bars may be taken directly from them when they are stationary, or through contact-rings and other brushes when revolving.

Reference is had to the accompanying drawings, in which the same parts are indicated by the same letters throughout the several views.

Figure 1 represents a perspective view of a commutator and brushes mounted on independent shafts and capable of revolving independently of each other. Fig. 2 represents a modification of the same device in which the brushes only revolve, the conductors being joined directly to the bars of the commutator, which is fixed. Fig. 3 represents a further modification of the device shown in Fig. 1, with the conductors jointed directly to the brushes, which are fixed, while the commutator is adapted to revolve. Fig. 4 represents a revolving commutator and fixed brushes, the conductors leading directly from the brushes to the contact-brushes of a motor or dynamo. Fig. 5 differs from Fig. 4 in having the commutator stationary and the brushes revolving. Fig. 6 shows a lead of the conductors somewhat different from the construction shown in Fig. 4. Fig. 7 shows a lead of the conductors somewhat different from the construction shown in Fig. 5. Fig. 8 is a similar view to that shown in Fig. 1, and shows a method of preventing the revolving brushes from leaving the commutator-surface under the action of centrifugal force. Fig. 9 represents an end view of the revolving brushes shown in Fig. 8. Fig. 9ᵃ represents an end view of another device for adjusting the revolving brushes against the action of centrifugal force. Fig. 10 shows in section a means of gearing together the shaft carrying the commutator and the one carrying the brushes, so that they will maintain a fixed ratio in their speeds. Fig. 10ᵃ represents a section along the line *x x* of Fig. 9ᵃ. Fig. 11 represents a section along the line 11 11 of Fig. 10, and looking in the direction of the arrow. Fig. 12 represents a diagrammatic view of the revolving commutator and brushes shown in Fig. 1, with conductors leading from the side of the revolving brushes to the contact-brushes of a motor or dynamo. Fig. 13 represents the revolving brushes shown in Fig. 1 mounted to revolve on the commutator of a dynamo or motor. Fig. 14 shows the method of indicating graphically the intensity and phase of an electromotive force. Fig. 15 shows the method of finding the intensity and phase of an electromotive force, which is the resultant of two electromotive forces of different phases acting in series. Fig. 16 shows the graphic method of determining the ratio of the windings in the ent angular velocities, it will be understood that a commutator-bar is the equivalent of a brush, and vice versa.

L represents the shaft of a motor or other translating device.

L' (shown in Fig. 21) represents a synchronous or induction motor.

L² (shown in Figs. 13 and 22) represents a dynamo or other translating device having fixed brushes L⁰ in addition to the revolving brushes F.

Fig. 10 shows a method of gearing the shaft G, which carries the brushes F to the shaft B, which carries the commutator A. The shaft G is hollow, allowing the shaft B to pass through it. On the end of shaft B is a cog-wheel B', meshing with the cog-wheel N, which turns on the pin $n$, secured to the rigid arm M. The wheel N meshes with the cog-wheel G', which is rigidly secured to the shaft G, thus causing the shaft G to revolve in a fixed ratio to the shaft B. It is obvious that a variable speed-gear or any other suitable gearing for connecting the two shafts may be adopted, if desired.

Q R S T are the conductors of a two-phase system.

Figure 17:
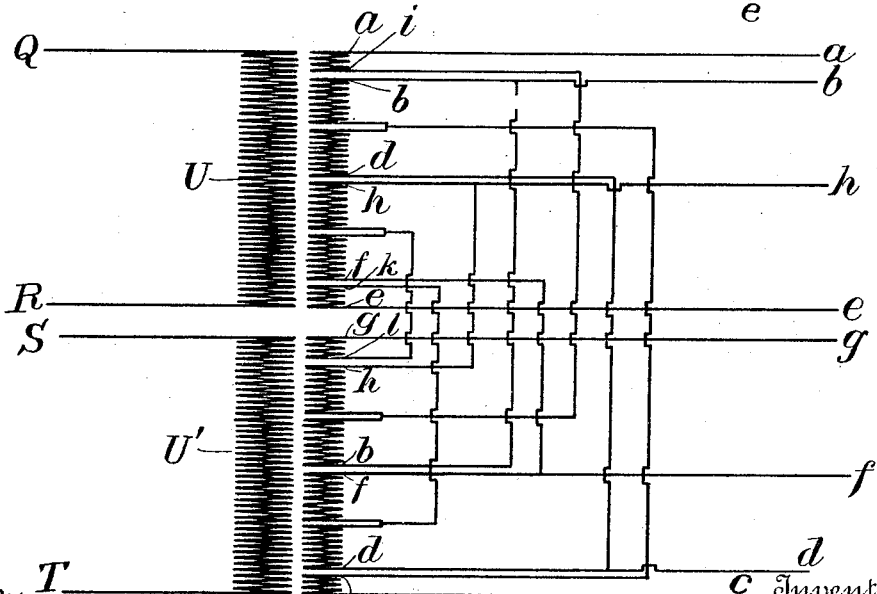
Figure 20:
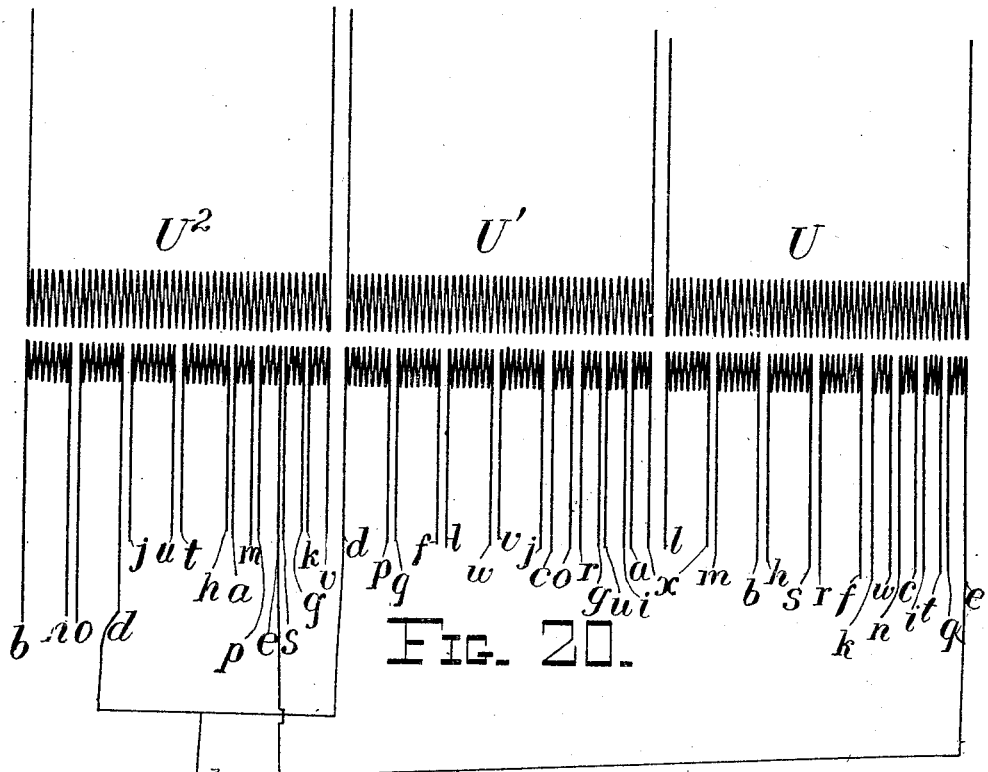

U and U' in Figs. 17, 21, and 22 and also U² in Fig. 20 are the primary coils of the transformers.

When the apparatus is at rest, the current flowing from the conductors K K will be identical in all respects to that entering at E E, provided the number of brushes, rings, and bars is the same throughout. If the commutator A is driven by a synchronous motor the brushes F remaining at rest, any pair of these brushes will yield a continuous current, which can be taken off directly from the brushes or from the corresponding conductors K. If the brushes F are now driven by a synchronous motor they will assume a fixed position relative to the commutator A, and the current passing out at K K will be identical in every respect to that entering at E E. It is evident from the above that in passing from a current of zero frequency to one equal in frequency to that entering at E the intermediate stages have been passed corresponding to the different speeds of the brushes F F. Therefore if the brushes F F are driven at any other speed than that of synchronism the current passing through the conductors K K will have a different frequency than that entering at E E. This frequency will depend on the original frequency combined with the difference in speed of the two parts. From this it follows that it is entirely immaterial whether the commutator alone revolves, or whether the brushes alone revolve, or whether both revolve, so long as the difference in speed of the two parts is the same. If a part of the brushes F F only are used, the number of phases of the current flowing through the corresponding conductors K K will be proportionally reduced. The number of commutator-bars and conductors E can be different from the brushes and conductors K.

Such a commutator will transform any polyphase current into any other, the number of phases being in proportion to the number of conductors E and K and the difference of the frequencies being determined by the relative rates of revolution of the brushes and commutators.

This device may be utilized in a variety of ways.

First. To make a dynamo capable of giving out currents of any frequency, mount the device on the shaft of the dynamo, as shown in Fig. 13 or indicated in Fig. 2. The commutator may now become the commutator of the dynamo, and the armature-conductors may be conducted directly to the bars of the commutator. On now revolving the brushes a polyphase current of any frequency can be obtained from the brushes I. The brushes can be driven from the shaft at any desired speed by gearing or belts or may be independently driven by a motor. P in Fig. 13 represents a pulley for driving the shaft G.

Second. This same device (shown in Fig. 13) makes a motor capable of starting and running in a variety of ways. ($a$) It is a self-starting synchronous motor provided the brushes are revolved at the proper speed and afterward clamped to belts, gearing, &c., so as to preserve the fixed ratio of speed. ($b$.) When the brushes are run by a small synchronous motor and they are fed by a polyphase current the motor will then be fed by a continuous current and will start, run, and stop like such a continuous-current motor. ($c$.) When running in either of these ways continuous current can be taken off by a pair of fixed brushes and used for exciting the field-magnets or any other purpose. ($d$.) The device mentioned in section ($a$) can be used to convert continuous into a polyphase alternating current of any number of phases and any frequency.

Third. If used to start or to vary the speed of an induction or synchronous motor, Figs. 4, 5, 6, 7, 12, and 22 show the connections for the various methods of using this device. The brushes F may be at rest, as it is only necessary to revolve one part. The connections to the motor and to the source of current may be made from either side of the device. By this arrangement current can be supplied to the motor at any desired frequency, and it will be self-starting. By regulating the speed of the moving part by belt, gearing, or other devices the frequency of the current reaching the motor can be controlled, and consequently its speed which will be in synchronism with the current reaching it. The speed of the moving part may be decreased as the motor speed increases, and when brought to rest the motor will reach synchronism with the original current. If the commutator be made the commutator of a motor and a polyphase current be supplied through the brushes F F, Figs. 2 and 13, then the frequency of the current reaching the armature and the consequent speed of the armature can be varied by varying the speed of the brushes.

Fourth. To start a motor under a load, Figs. 4, 5, 6, 7, 13, and 21 and 22: By driving the brushes by a synchronous motor the large motor will start under a load and run at a speed depending on the electromotive force.

Fifth. To start a synchronous motor under a load: Applied as above a synchronous motor will start under a load, and following the increase in the frequency of the current reaching it will run up to synchronism with the current from the original source.

Sixth. Applied to the armature of a motor of the induction type having a laminated field with coils closed on themselves it makes it a variable-speed motor. The armature and field may obviously be interchanged.

The source of polyphase currents may be a generator or a transformer or transformers. Moreover, the transformers may be so constructed that a polyphase current of one system is converted into a polyphase current of another system—such, for instance, as are described in my application, Serial No. 517,726, filed July 16, 1894. In Fig. 20 the connections are made by connecting similar letters and using $a\ b\ c\ d$, &c., to take off the polyphase current.

In Fig. 14 the length of OZ represents the amount of an electromotive force, and its phase is represented by the angle $\alpha$, the zero of phase being OX. Hence any given line in the diagrams represents the amount and phase of the electromotive force along any wire, as is well known to those skilled in the art. If we have an electromotive force along a given wire and join to it another electromotive force of the same frequency, but a different phase, the resultant electromotive force is given by $a'\ c'$, the original parts of the force being $a'\ a'\ c'$ in Fig. 15, and its phase by the direction of $b'$ and $a'\ d'$. Thus in Fig. 17 I wind the coil $a\ i$ and lay off its electromotive force $a\ i$ in Fig. 16 proportional to the number of coils in $a\ i$. Similarly $i\ b$ is laid off at right angles to $a\ i$ because the coil is wound on the second transformer having a phase ninety degrees from the first. Thus the whole system of electromotive forces, as shown, is equivalent to the system $o\ a, o\ b, o\ c, o\ d, o\ e, o\ f, o\ g, o\ h$, which, being all equal and at equal angles, make an open polyphase system of eight phases. Joining $a\ b, b\ c$, &c., the lines will represent the electromotive forces and phases in a polyphase system of the closed-circuit variety. In general any system of electromotive forces can be constructed out of two or more original ones. When the polyphase system is not symmetrical, the figure $a\ b\ c\ d\ e\ f\ g\ h$ will not be symmetrical. To construct a diagram in general, lay down on paper any number of points $a\ b\ c$, &c., and connect them together by lines drawn parallel to the given electromotive forces. Then wind the coils proportional to these lines.

In transformers for a polyphase system electromotive forces in different phases are induced and the intensity depends on the ratio of the primary and secondary windings. Hence any polyphase current can be obtained from any two transformers whose phases differ in any degree from each other.

Figs. 16 and 17 represent an eight-phase system of electromotive forces derived from a pair of transformers of the two-phase system. The two transformers are each wound with six secondary coils, the windings of two coils being proportional to $a\ i$ and of four coils proportional to $i\ b$. The coils shown in Fig. 17 are connected, as shown in Fig. 16—that is, the number of coils in the segment $a\ i$ of the secondary winding is proportional to the length of the line $a\ i$ in Fig. 16, and so on for the other segments, the wires leading from eight points $a\ b\ c\ d\ e\ f\ g\ h$ forming the conductors of the eight-phase system. The conductors Q R S T represent the conductors of the two-phase system and U and U' the primary coils of the transformers.

Figure 18:
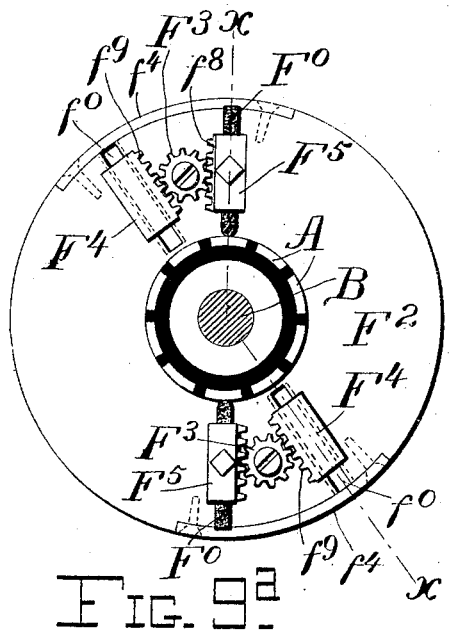
Figure 18:
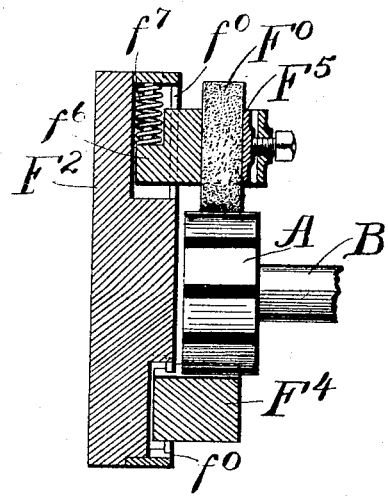
Figure 18:
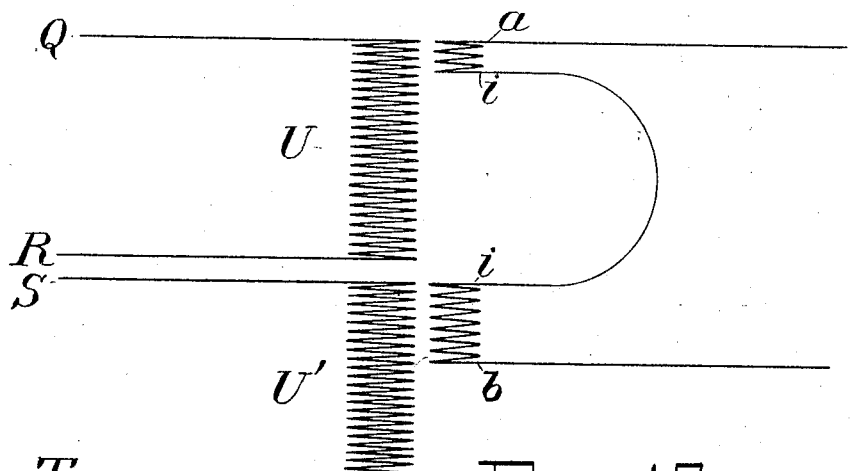

In Fig. 18 an open-circuit system is shown, the arrangement of the wires in the secondary coils being similar to that indicated by the single pair of coils $a\ i$ and $i\ b$ in open circuit, as shown. On each transformer there will then be in this case four large and four small coils, two of which are connected, as shown in Fig. 18, the rest being omitted for the sake of clearness in the drawings.

Figure 19:
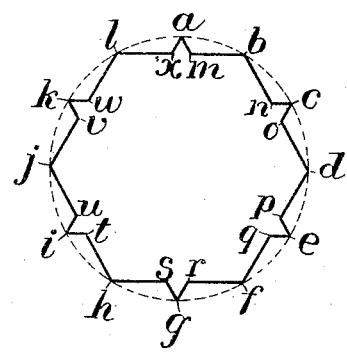

Fig. 19 represents the method of connecting the secondary coils and the relations of the windings to produce a twelve-phase system. In this case one set of coils is proportional to $a\ m$ and the other set to $m\ b$.

Fig. 20 shows the arrangement of the coils for a twelve-phase system derived from a three-phase. The connections are made by connecting similar letters and using wires $a\ b\ c\ d$, &c., to take off the polyphase current. Two of these connections are shown at $d$ and $e$ in Fig. 20, the rest being omitted for the sake of clearness in the drawings.

Fig. 21 shows the combination of an eight-phase system derived from a two-phase, as in Fig. 17, with the device for varying the frequency shown in Fig. 1, and a synchronous-motor operated thereby. If the brushes F remain fixed and the commutator A is revolved by a synchronous motor a continuous current is produced in the conductors K. If not run synchronously an alternating current is produced. If, when the commutator A is run by a synchronous motor, the brushes F are revolved, an alternating current is produced whose frequency depends on the original frequency and on the difference in speed between the brushes F and the commutator A. Any other translating device may be substituted for the synchronous motor shown in this figure. The conductors from the transformers may also be connected to the brushes I, and a motor may be mounted on the shaft B, as shown in Fig. 22, in which the brushes F are made to revolve on the commutator A of the motor L². If revolved synchronously, a continuous current will be supplied to the motor; but at any other speed an alternating current will be supplied, and hence either a continuous-current motor or an alternating-current motor may be used at L².

In the diagram shown in Fig. 23 the closed-circuit transformer of Fig. 17 is connected to one of the combinations of armature and brushes shown in Figs. 4 to 17, while the open-circuit transformer shown in Fig. 18 may be similarly connected, if desired. The transformer is represented as connected to the upper device on the sheet, and the dotted lines indicate that it may be connected to any one or more of the other devices. It will be seen that a continuous current will be carried off by the pairs of conductors to the right of the said diagram, provided these devices are run in synchronism with the current, while an alternating current will be carried off at any other relative speed, the polyphase current from the transformer being converted into a continuous current or an alternating by means of the commutator A and brushes F or F', either or both of which may be made to revolve. It is evident that the speed of the commutator necessary to produce continuous currents can be reduced one-half, one-third, &c., by making the number of the commutator-bars two, three, &c., times the number of wires from the transformer.

In the specification and claims a continuous current is considered to be an alternating current of zero frequency. It will thus be seen that by an arrangement similar to that herein shown it is possible to transform an alternating current of any number of phases and frequency to an alternating current of any desired number of phases and frequency, and to further change this latter current either into a continuous current or an alternating current of greater or less number of phases and frequency, to run a synchronous or induction motor thereby at any desired speed, to start the same under a load, and to accomplish the great variety of results hereinbefore described, as well as many others that would readily suggest themselves to any skilled electrician.

Having thus described my invention, what I claim, and desire to secure by Letters Patent of the United States, is—

1. The combination with a source of alternating currents of electricity of a commutator or brushes, a plurality of electrical conductors connecting said source of electricity with said commutator or brushes, a plurality of brushes or commutator bars adapted to take off the current, means for varying the angular velocity of said commutator bars relative to said brushes, and a synchronous electric motor, distinct from said commutator, and said brushes electrically connected either to said brushes or to said commutator bars, and receiving currents therefrom, substantially as described.

2. The combination with a source of alternating currents of electricity, of a commutator and a plurality of electrical conductors connecting said source of electricity with said commutator, of a plurality of brushes adapted to take the current from said commutator, means for revolving said commutator and said brushes independently of each other, and a synchronous electric motor, distinct from said commutator and said brushes, connected to said brushes and receiving currents therefrom, substantially as described.

3. The combination with a source of alternating currents of electricity of a plurality of electrical conductors connecting said source of electricity with said commutator, a plurality of brushes adapted to take the current from said commutator, means for varying the angular velocity of said commutator relative to said brushes, and a synchronous electric motor, distinct from said commutator and said brushes, and electrically connected to said brushes and receiving currents therefrom, substantially as described.

4. The combination with a source of polyphase currents of a plurality of transformers so connected thereto that some of the secondary currents pass through windings on a plurality of the transformers, thus producing a polyphase current of a different number of phases from the primary current, a commutator or brushes, and a plurality of electrical conductors connecting said transformer with said commutator or brushes, of a plurality of brushes or commutator bars adapted to take off the current, means for producing a relative rotation between said commutator and said brushes, and a translating device electrically connected to said brushes or to said commutator bars, substantially as described.

5. The combination with a source of polyphase currents, of a plurality of transformers so connected thereto that some of either the primary currents or the secondary currents pass through windings on a plurality of the transformers, thus producing a polyphase current of a different number of phases from the primary current, a commutator or brushes, and a plurality of electrical conductors connecting said transformer with said commutator or brushes, a plurality of brushes or commutator bars adapted to take off the current, means for varying the angular velocity of said commutator relative to said brushes, and a translating device electrically connected to said brushes or to said commutator bars, substantially as described.

6. The combination with a source of polyphase currents, of a plurality of transformers so connected thereto that some of the secondary currents pass through windings on two or more of the transformers, thus producing a polyphase current of a different number of phases from the primary current, a commutator or brushes, a plurality of electrical conductors connecting said transformer with said commutator or brushes, and means for driving said commutator or brushes in synchronism with the current, or at any integral multiple of said speed for the purpose of converting the polyphase current into a continuous current; substantially as described.

7. The combination with a source of polyphase currents, of a plurality of transformers so connected thereto that some of either the primary currents or the secondary currents pass through windings on two or more of the transformers, thus producing a polyphase current of a different number of phases from the primary current, a commutating device, a plurality of electrical conductors connecting said transformer with said commutating device and means for driving the commutating device in synchronism with the current, or at any integral multiple of said speed for the purpose of converting the polyphase current into a continuous current, and means for carrying off said continuous current, substantially as described.

8. The method of starting a synchronous motor which consists in producing a continuous current from an alternating one by means of a commutating device in synchronism with the current and gradually increasing the frequency of the current, by slowing down the commutating device until it comes to rest, substantially as described.

9. The combination with a disk slotted in an approximately radial direction, of a brush holder adapted to slide in said slot and provided with a rack on one side thereof, of a sliding weight having a guide lug projecting into another one of said slots, and also provided with rack-teeth on one side thereof, and a gear wheel pivotally mounted on said disk between said sliding weight and said brush holder and meshing in the rack-teeth on each, substantially as described.

10. The combination with a disk slotted in an approximately radial direction, of a brush holder adapted to slide in said slot and provided with a rack on one side thereof, and a spring adapted to press said brush holder toward the center of said disk, of a sliding weight having a guide lug projecting into another one of said slots, and also provided with rack teeth on one side thereof, and a gear wheel pivotally mounted on said disk between said sliding weight and said brush holder and meshing in the rack teeth on each, substantially as described.

In testimony whereof I affix my signature in presence of two witnesses.

HENRY A. ROWLAND.

Witnesses:
JOSEPH S. AMES,
WILLIAM B. CLARK.